United States Patent [19]

Pritchard et al.

[11] 4,235,737

[45] Nov. 25, 1980

[54] METHOD FOR TREATING RADIOACTIVE LIQUIDS

[76] Inventors: James F. Pritchard, 1101 Greenleaf Rd.; Robert R. Komrow, Rte. 2, Box 52, Botany Woods, both of Hartsville, S.C. 29550

[21] Appl. No.: 865,689

[22] Filed: Dec. 29, 1977

Related U.S. Application Data

[63] Continuation-in-part of Ser. No. 718,876, Aug. 30, 1976, abandoned.

[51] Int. Cl.$^2$ .................................... C09K 3/00

[52] U.S. Cl. .............................. 252/301.1 W; 210/682

[58] Field of Search .................. 210/24 R, 38 C, 42 R, 210/51-54, 45, 59; 134/617; 252/301.1 S, 301.1 W; 423/6, 7; 260/17.4 GC, 17.4 ST

[56] References Cited

U.S. PATENT DOCUMENTS

| | | | |
|---|---|---|---|
| 2,918,700 | 12/1959 | Hatch | 210/54 |
| 3,142,648 | 7/1964 | Leflaur | 252/301.1 W |
| 3,262,274 | 7/1966 | Nelson, Jr. | 61/0.5 |
| 3,298,960 | 1/1967 | Pitzer | 252/301.1 W |
| 3,463,738 | 8/1969 | Fitzgerald et al. | 252/301.1 W |
| 3,723,338 | 3/1973 | Godfrey | 252/301.1 W |
| 3,773,682 | 11/1973 | Marshall et al. | 252/301.15 |
| 3,838,061 | 9/1974 | Cuaz et al. | 252/301.1 W |
| 3,896,045 | 7/1975 | Peeters et al. | 252/301.1 W |
| 3,935,099 | 1/1976 | Weaver et al. | 210/43 |
| 3,969,239 | 7/1976 | Shinohara et al. | 210/45 |
| 4,045,387 | 8/1977 | Fanta et al. | 210/24 |
| 4,056,112 | 11/1977 | Calmon | 252/301.1 W |

FOREIGN PATENT DOCUMENTS 2015010 4/1970 France .

OTHER PUBLICATIONS

"An Honor for Super-Slurpers," *Agricultural Research*, Jan. 1976, pp. 12 & 13.

"Super-Slurpers-Compound with a Super Thirst," *Agricultural Research*, Jun. 1975, pp. 7-9.

"Highly Absorbent Starch-Based Polymer," presented at the Int. Non-Wovens & Disposable Assoc., Wash., D.C., Mar., 5-6, 1974.

*Primary Examiner*—Charles N. Hart
*Assistant Examiner*—Peter A. Hruskoci
*Attorney, Agent, or Firm*—Fitzpatrick, Cella, Harper & Scinnto

[57] ABSTRACT

A process for treating and handling radioactive liquids and rendering such liquids safe for handling, transportation and disposal, the process comprising adding thereto a small amount of a water-insoluble alkali salt of an aqueous alkali saponified gelatinized-starch-polyacrylonitrile graft polymer, to form a solid, semi-solid or gel product.

5 Claims, No Drawings

METHOD FOR TREATING RADIOACTIVE LIQUIDS

CROSS-REFERENCE TO RELATED APPLICATION

This application is a continuation-in-part of U.S. Application Ser. No. 718,876, filed Aug. 30, 1976 now abandoned.

BACKGROUND OF THE INVENTION

1. Field of the Invention

This invention relates to a method of treating or handling liquids and more particularly to a method for treating radioactive liquids such as wastes containing radioactive material.

2. Description of the Prior Art

The treatment, handling and disposal of liquid industrial wastes is a problem which has become increasingly more important in recent years due to the quantity of wastes generated and, significantly, the increasing awareness of the deterioration of our environment. Much new technology has been developed in this area but it is expected that further improvements will be necessary to maintain and improve the quality of the environment, and increasingly stricter governmental regulations will require better means for treating, handling and disposing of liquid wastes. Considering the increasing use of nuclear power as a primary source of energy, and the nature of the wastes derived from such plants, the need for reliable and economically feasible methods for treating, handling and disposing of such wastes becomes evident. Special techniques are necessary and numerous safety problems are presented in treating, transporting and disposing of radioactive materials.

Liquids containing radioactive materials are usually derived from several sources, and as used herein, the term "radioactive liquids" is intended to include any liquid containing any radioactive material in a broad sence. Normally as understood by persons skilled in the art, a radioactive liquid is a liquid vehicle such as water and/or an organic solvent containing radioactive solids dissolved and/or suspended therein. More particularly, in the disclosed embodiments of the invention which follow, it refers to liquids such as water containing radioactive materials or elements formed as by-products in nuclear energy processes or formed in the cleaning, etc., of nuclear reactors. The term radioactive liquid is meant to also include high solid content fluids; i.e., sludges and semi-solids. It is not intended to limit this invention to a particular type of radioactive liquid.

Such radioactive liquids are typically and predominantly composed of water with a very small amount of solid matter dissolved and/or suspended therein. Such liquids may also contain significantly amounts of organic or other liquids. It is difficult to remove the radioactive material from the liquid and, of course, the liquid may not simply be disposed after such removal since it may still contain a small amount of radioactive material and hence even the liquid after removal of most of the solid radioactive material still retains a substantial amount of dangerous radioactivity.

The liquid vehicle, generally water, may be evaporated as is taught in the prior art prior to treating the radioactive material. However, where a large quantity of radioactive liquids is generated, very large and expensive evaporators are necessary to remove the water prior to treatment of the solid radioactive material, and the process may become prohibitively expensive. There is a need therefore for a simple, efficient and inexpensive process for treating and disposing of radioactive liquids.

Various processes are known for treating and disposing of radioactive liquids such as wastes. For example, U.S. Pat. No. 3,298,960 discloses a method for the disposal of waste solutions containing dangerous substances such as poisons or radioactive wastes by the addition of a gel forming material to the waste bearing solutions to partially solidify the waste solutions thereby facilitating handling and disposal. The gel products are formed by the addition of sodium silicate or formaldehyde to certain metal cleaning waste solutions derived by the application of the metal cleaning solutions to inaccessible metal surfaces of nuclear reactors.

French Pat. No. 2,015,010 discloses a method of concentrating aqueous solutions or suspensions of radioactive wastes by first concentrating the solutions by a known method and then solidifying the concentrated solution by mixing the same with a synthetic polymerized alcohol such as polyvinyl alcohol, followed by drying to cause hardening of the alcohol to render it water-insoluble and to reduce the initial volume of the alcohol and solution.

U.S. Pat. No. 3,142,648 discloses a process for the production of solid products containing radioactive waste material. After the formation of an aqueous mud such as by removing as much of the liquid contained therein as possible, generally water, the process involves mixing the mud with a fluidified bitumen in the presence of a surface active or wetting agent which serves to permit coating of the mud and to facilitate separation of any water contained therein. The greater part of this water is then eliminated by decantation or other means and the resulting bituminous mass is further mixed at a temperature such that it becomes sufficiently fluid and is finally poured in order to obtain, on cooling, solid blocks of suitable plasticity.

U.S. Pat. No. 3,838,061 discloses a method of packaging radioactive waste products which have previously been converted to dry powder form, by incorporating the powder in a resin which is polymerizable at room temperature followed by copolymerizing the resin with a monomer to obtain a solid material. The powdered radioactive waste is obtained by, for example, subjecting a solution thereof to evaporation.

U.S. Pat. No. 3,463,738 discloses the conversion of radioactive organic liquids into a solid form by homogeneously mixing liquid polyethylene with the radioactive liquids and then cooling the resulting mixture to form a solid, essentially nonporous, rigid polyethylene body which effectively contains the radioactivity.

Other prior art processes for decontaminating or containing radioactive wastes are disclosed in U.S. Pat. No. 3,262,274 and in U.S. Pat. No. 3,896,045.

SUMMARY OF THE INVENTION

It is an object of the present invention to provide a process for treating and handling radioactive liquids.

It is a further object of the present invention to provide a simple and inexpensive process for treating and handling radioactive liquids.

it is still a further object of the present invention to provide an efficient and safe process for treating and handling radioactive liquids.

It is yet another object of the present invention to provide a process for treating radioactive liquids to render their transportation and disposal safer than processes presently known to us.

It is still another object of the present invention to provide a process for treating and handling radioactive liquids, especially radioactive wastes, having the foregoing advantages.

Other objects and advantages of this invention will become apparent from the description which follows.

Briefly, the present invention comprises a process for treating radioactive liquids by adding to the liquids a highly absorbent starch-containing polymer composition to form a solid or semi-solid product or gel which renders any subsequent treatment, handling, transportation or disposal of the liquids safer and more efficient. The polymeric composition comprises water-insoluble alkali salts of aqueous alkali saponified gelatinized-starch-polyacrylonitrile graft polymers. Only a small amount of the polymer is required to form the gel and the consistency of the gel can be modified by varying the amount and type of the polymer added to the liquid. The process is reversible and the polymer can be recovered and reused.

The process of the invention is described in further detail in the description which follows.

DESCRIPTION OF THE PREFERRED EMBODIMENTS

The polymer which is employed in the process of the present invention is a starch-containing polymer composition which can absorb many times its own weight of water or an organic liquid. The polymer is water-insoluble and is prepared by saponifying a gelatinized starch-polyacrylonitrile graft polymer in an aqueous slurry with an alkali in amounts such that the molar ratio of alkali to the acrylonitrile repeating element of the polymer is from about 0.1:1 to 7:1 to form a solution or dispersion of water-soluble saponified graft polymer. The absorbent water-insoluble form of the polymer is prepared by simply drying the solution or dispersion obtained from the saponification step. The process for preparing such polymers is more specifically set forth in U.S. Pat. No. 3,935,099 and the disclosure of this patent is expressly incorporated herein by reference.

The solution or dispersion may be dried by casting a film therefrom and drying by a known method such as oven drying. The resulting dry films are water-insoluble and absorb many times their weight in water forming clear, cohesive, self-supporting sheets. The dry films can, if desired, be ground or milled to flakes or powders which have greatly increased surface areas over the films, and consequently higher absorption rates. The water-insoluble character is retained by the flakes or powder.

The process of the invention comprises adding a small amount of the polymer to the radioactive liquids to form a solid, semi-solid or gel product which can easily and safely be handled and transported. The amount of polymer added to the liquid is not particularly critical, and only a small amount is required since the polymer can absorb many times its own weight in liquid. The preferred amount of polymer is typically 1 part by weight polymer to 2000 parts or less, preferably 300–400 parts, by weight of the radioactive liquids. Higher or lower amounts of polymer can be employed depending upon the results desired, with the higher amounts providing a more solid product.

An unexpected advantage of the present invention is the greatly reduced emission of radioactive nucleides, such as airborne, particulate or gaseous, from the gelled radioactive liquid. It is known that radioactive nucleides such as iodine are easily emitted from radioactive liquids and become dangerous to the environment in the case of an accidental radioactive spill. When analyzing radioactive liquids, it is also known that the addition of sodium hydroxide will aid in preventing or slowing down such iodine emission. An Example 3 indicates this problem is unexpectedly solved by the process of the invention. Accordingly, the present invention can be used to reduce the emission or release of by-products such as radioactive nucleides from radio-active liquids such as spills or leaks. Of course, an elevated temperature is employed in Example 3 below in order to clearly illustrate this advantage, since such release is accelerated with elevated temperatures. It is not necessary to utilize elevated temperature to achieve this advantage with the present invention.

The temperature is not particularly critical and it is preferred that the temperature be elevated to increase the rate of gel formation. The preferred temperature range is 0 to 95° C. It is not absolutely essential to heat the liquid upon the addition of the polymer, and the process of the invention can be practiced at room or ambient temperatures.

The pH of the liquid is not significant as long as it is not substantially acidic. With a strongly acidic solution, it is very difficult to obtain a gel product, and therefore an alkaline pH is preferred. Specifically, it is preferred that the pH be at least 5.5, although the process can be successfully operated at lower pH's.

It is also preferred, although not necessary, that agitation be provided in order to ensure that the polymer is uniformly dispersed in the liquid. The presence of agitation decreases the time required for forming the gel product.

The product resulting from the addition of the polymer to the liquid is a semi-solid or gel-type material, depending upon the amount of polymer added to the liquid. The product can be rendered almost solid by, i.e., evaporating the water or adding an inert filler such as cellulose, or like material, to the polymer prior to or after the addition of the polymer to the liquid. The amount or type of the filler is not critical, and the preferred amount is dependent on the selected filler. Any filler can be employed as long as it does not affect the property of the polymer to absorb the water contained in the liquid waste solution. Other exemplary fillers are sawdust, vermiculite, cement, etc.

The absorption rate of the polymer can also be varied by "cleaning" the polymer prior to use. The polymer may be "cleaned" by washing with alcohol. The absorption rate of the polymer can be increased by this procedure, and although not necessary, smaller amounts of the polymer can be used if its absorption rate is increased and hence the cleaning of the polymer may be preferred prior to use.

The nature of the polymer is such that no reaction occurs between the contents of the liquid waste solution and the polymer. The gel or semi-solid product, or solid product if desired, remains in that state for an indefinite period of time, and additional ingredients can be added such as agents which inhibit or prevent biological attack which might cause a reversal in the absorption reaction. The reaction is reversible, and the product can be converted back into the liquid state by any suitable procedure. A typical procedure is to acidify the product by the addition of any suitable acidic material, such as hydrochloric acid. The amount of the acidic material added is not critical, as long as the result is that the product is rendered acidic. It is preferred that the pH be lowered to below 3 in order to increase the rate of recovery. Once the product is acidified, and it is converted back into the liquid form, the water is removed and the polymer can be recovered for subsequent reuse by, for example, drying. Since the polymer does not usually react with the solids contained in the radioactive liquids, and since the polymer is not adversely affected by the absorption operation, it can be recovered for subsequent reuse. The polymer used in the invention is non-toxic and can therefore be used safely in the process of the present invention. If desired, as pointed in U.S. Pat. No. 3,935,099, if the liquid contains an organic liquid in substantial amount, an amine salt of the polymer can be formed by reacting the free acid form thereof with a suitable amine, which amine salt of the polymer will absorb the organic constituent in the liquid. The alkali salt can be used together with the amine salt if such a liquid contains both water and an organic liquid.

The apparatus used in the process of the invention can be any apparatus conventionally available in the chemical engineering art. Of course, special precautions may have to be taken concerning the apparatus, such as by lining the same with lead, glass or other suitable material for safety reasons. Those skilled in this art are aware of precautions that should be taken to prevent possible dangerous exposure to radioactive materials, and those skilled in the art are also aware of apparatus that could be employed to practice the present invention.

As an alternative embodiment of the invention, the polymer can be employed in different situations to achieve substantially the same results. The radioactive liquids can be formed into a gel by the method of the invention to render transportation of the same safe. Thus, the liquid material may be converted into a gel at the nuclear reactor site and the gel transported elsewhere in a safe manner for disposal. Similarly, since the absorption reaction is reversible, the liquid material can be pumped or transported into a suitable container, and adding the polymer to form a gel to render transportation safe. At the disposal site, if desired, the gel can be acidified as described above to convert the gel back into the liquid form for disposal. Of course, the gel product can be disposed of in that form.

Other embodiments of the invention are preventing leakage of liquid radioactive materials held in containers and in the handling of spills by adding the polymer to form a gel product to thereby effectively contain the radioactive materials within the gel. A significant advantage of the present invention is, as pointed out above, the substantial prevention of iodine emission during a spill. Those skilled in the art will be aware of many other modifications and changes that can be made in the process of the invention to adapt the same to various circumstances that exist in the industry. It is only essential that a small amount of the above-described polymer be added to the liquid solution to form the gel, semi-solid or solid product which can safely be stored, transported or disposed of as desired, using conventional methods and techniques.

The following examples are given to further illustrate the process of the invention, and should not be construed as placing any limitations upon the invention.

EXAMPLE 1

Five hundred milliliters of tap water and impurities (for example, derived from a typical soil sample) are mixed to form a simulated radioactive waste. The amount of soil added is about one-quarter teaspoon. A small amount, about one-half teaspoon, of the polymer described above is added to the simulated radioactive waste with agitation in a blender. The liquid begins to set into a gel in about 30 seconds and is completely gelled in about 15 minutes. The particular polymer employed was H-SPAN hydrolized starch polyacrylonitrile.

As illustrated in the foregoing Example, the time necessary for the gel to be formed is dependent to an extent upon the amount of polymer added. When the amount of polymer used is about 1 part by weight based on 300–400 parts by weight of the liquid radioactive wastes, it is expected that the time necessary to form a gel or like product is on the order of 2 minutes. The amount of time is not critical, and can be varied as desired by those of ordinary skill in the art.

EXAMPLE 2

An aqueous radioactive liquid of the following composition was drawn from the primary coolant system of a nuclear power plant in a refueling shutdown condition with refueling taking place:

Boron: 2280 ppm
pH: 5.0
Activity: $9.0 \times 10^{-3}$ μci/cc
$fl^-$: 0.01
$cl^-$: 0.05
water: balance To 50 milliliters of the primary coolant of the above composition were added about 20 milligrams of the H-SPAN polymer, while agitating the sample with a glass rod. After three minutes, an equal amount of the same polymer was also added. At this time, it was noted that the polymer began to swell. After an elapsed time of 6 minutes from the first addition, a third addition of the same amount of the same polymer was made, and at this time, it was noted that the sample became very thick. Fourth and fifth additions of the same amount of the same polymer were made at elapsed times of nine and twelve minutes, respectively. After a total of fourteen minutes of elapsed time, from the first addition, the container was inverted but no liquid came out inasmuch as it was completely gelled.

EXAMPLE 3

The gelled liquid of Example 2 was placed in a boiling flask and the temperature of the flask was increased by means of an electric external heating element. The gel eventually reached its saturation temperature and vapor was observed during this time. For fifteen minutes, the vapor was passed through a condensing unit and the distillate was collected. When the distillate was tested for the presence of iodine, it was found that, compared with the amount of iodine present in the primary coolant composition of Example 2, about 95% of that iodine was retained in the gelled material despite the boiling temperatures employed.

Considering the fact that heating would normally accelerate the release of iodine from a radioactive liquid, and further that when sodium hydroxide is added to a radioactive liquid, about 75% of the iodine is normally released when the liquid is heated to near saturation temperature in approximately three minutes, the foregoing data is unexpected and illustrates a significant advantage of the present invention in retaining substantially all of the iodine in the gelled material.

EXAMPLE 4

100 milliliters of an aqueous primary coolant, of the composition used in Example 2, was added to a tray measuring about 2×12×18 inches. To the coolant in the tray was then added about 1 gram of the H-SPAN polymer by dusting the polymer over the surface of the coolant. The polymer began absorbing fluid on contact and at the end of two minutes, the fluid in the tray was almost completely gelled. Three minutes after the addition of polymer to the fluid, the tray was turned upside down but there was no loss of the material from the tray.

Many other changes are possible in the process of the invention as described above, and these changes can be made without departing from the spirit and scope of the invention. It is intended therefore that the invention be limited only by the scope of the claims appended hereto.

What is claimed is:

1. A reversible process for treating radioactive liquid composed of radioactive solids dissolved or suspended in a liquid vehicle selected from the group consisting of water and an organic liquid, which process comprises: adding to the radioactive liquid having a pH greater than 5.5, a sufficient amount of an absorbent consisting of a water-insoluble alkali salt of aqueous alkali saponified gelatinized-starch-polyacrylonitrile graft polymer to form a product comprising a gel containing said radioactive solids by the absorption of the said liquid vehicle by said polymer, acidifying said product sufficiently to reliquify said product and separating and recovering said polymer from the reliquified gel.

2. The process of claim 1, wherein the amount of said polymer added to said radioactive liquid is 1 part by weight per 300 to 400 parts by weight of said radioactive liquid.

3. The process of claim 1, wherein the amount of said polymer added to said radioactive liquid is 1 part by weight per up to 2000 parts by weight of said radioactive liquid.

4. The process of claim 1, wherein said radioactive liquid is heated to an elevated temperature no greater than the boiling point of said radioactive liquid.

5. The process of claim 1, including subjecting said radioactive liquid to agitation.

* * * * *